Aug. 2, 1960
C. AUSENDA ET AL
2,947,203
FABRICATION SYSTEM
Filed July 7, 1954
7 Sheets-Sheet 4
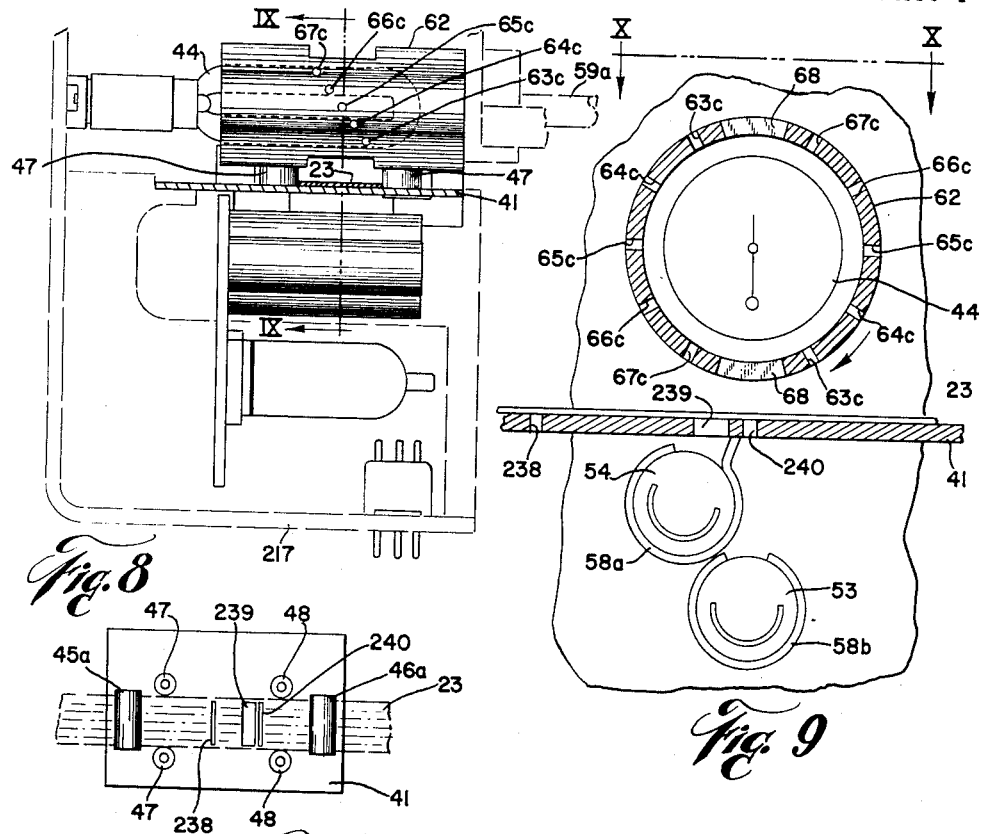
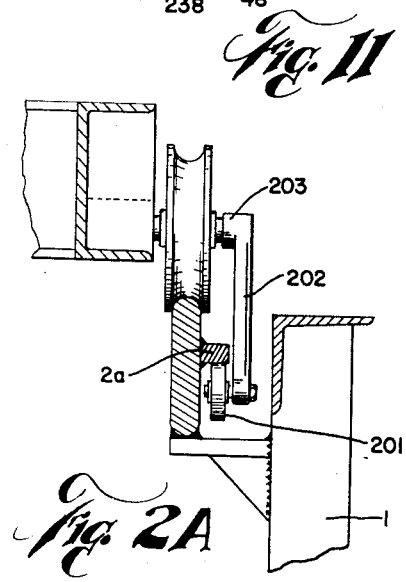
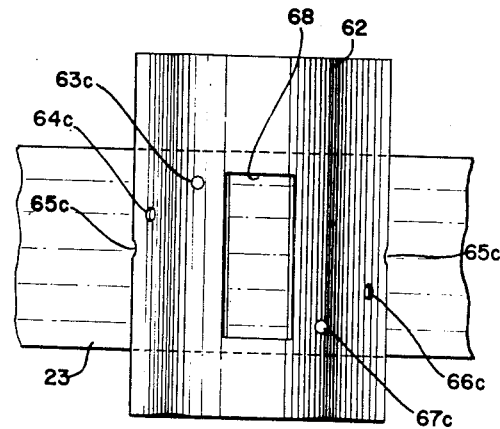
INVENTORS
CARLO AUSENDA
ROBERTO DESSALLES
BY Hooper, Leonard & Buell
their attorneys

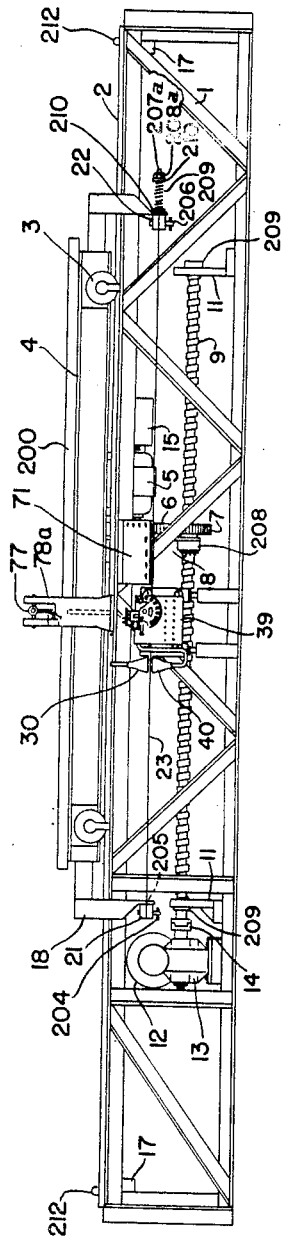

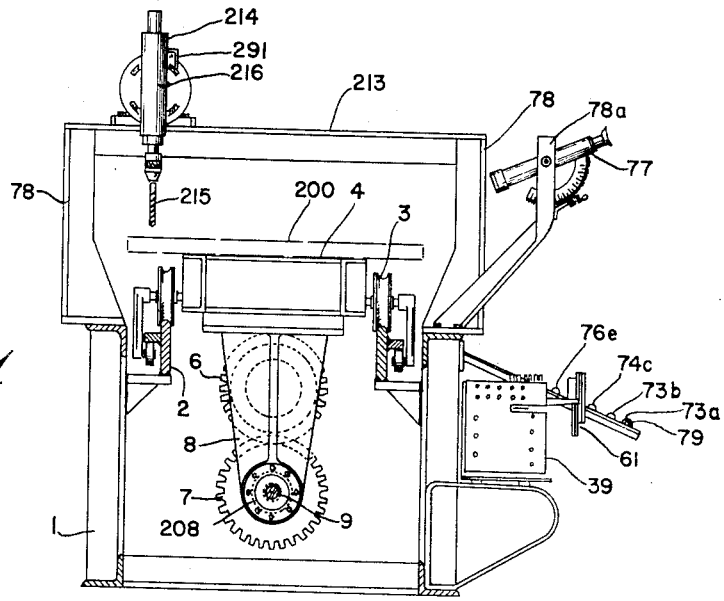

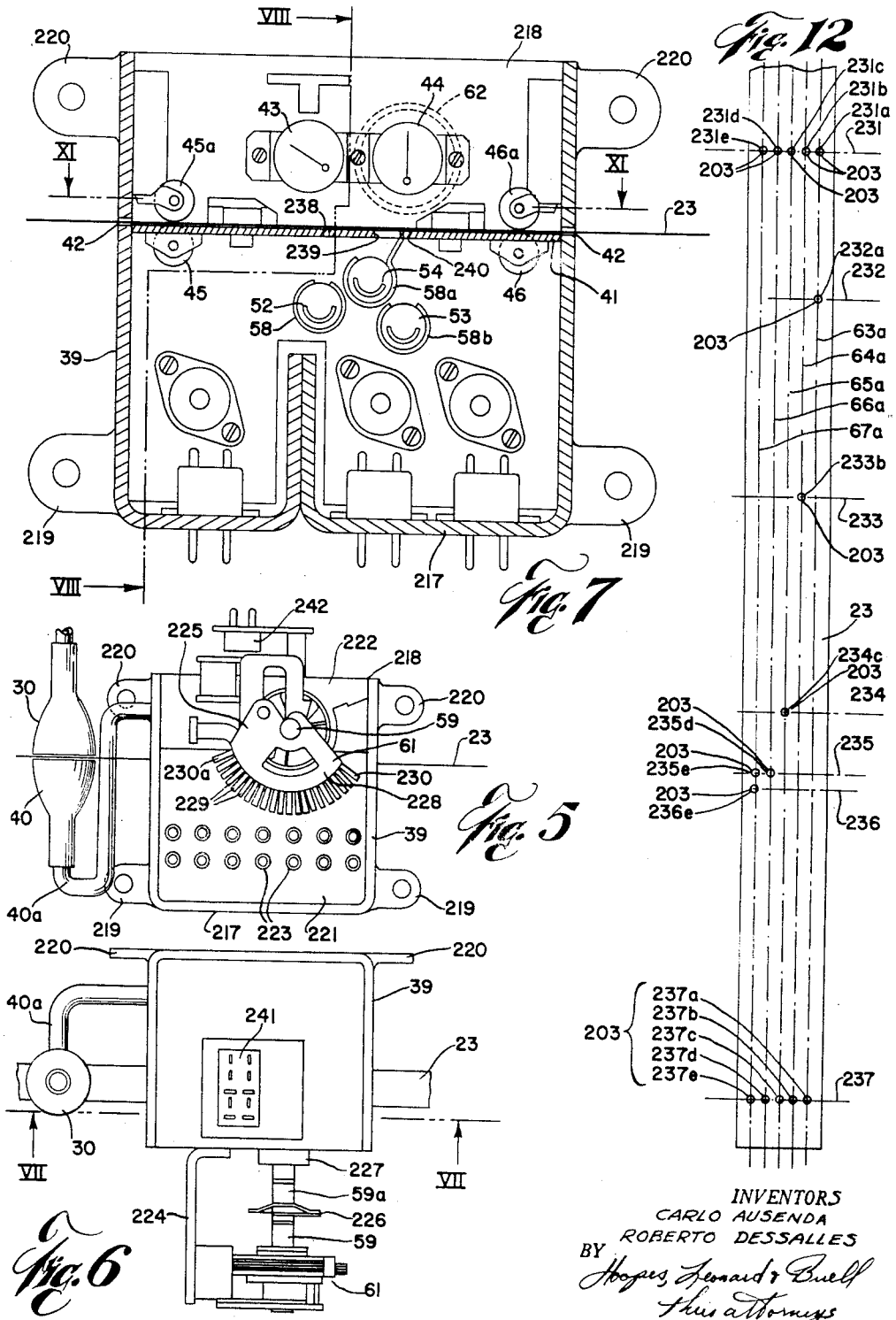

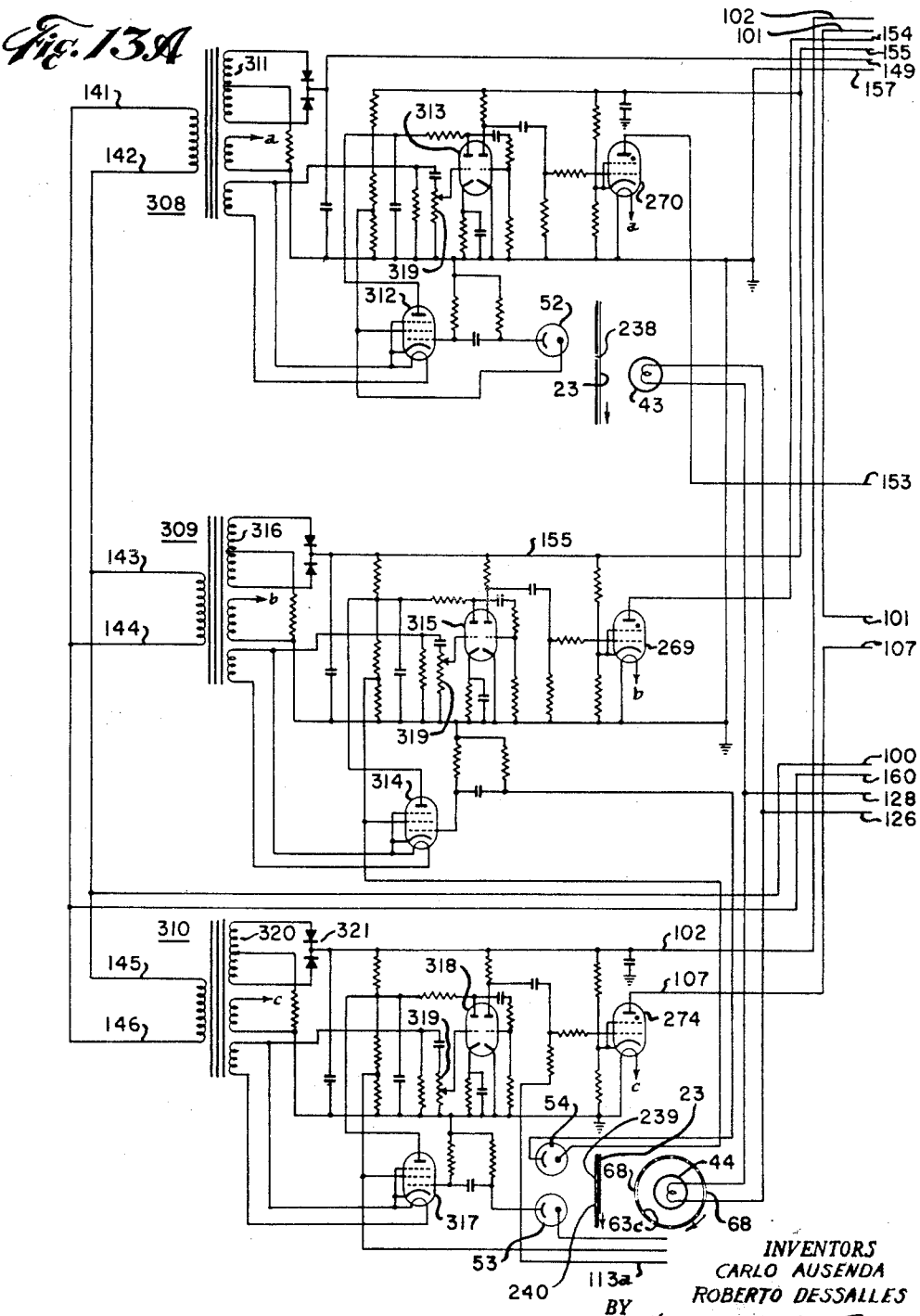

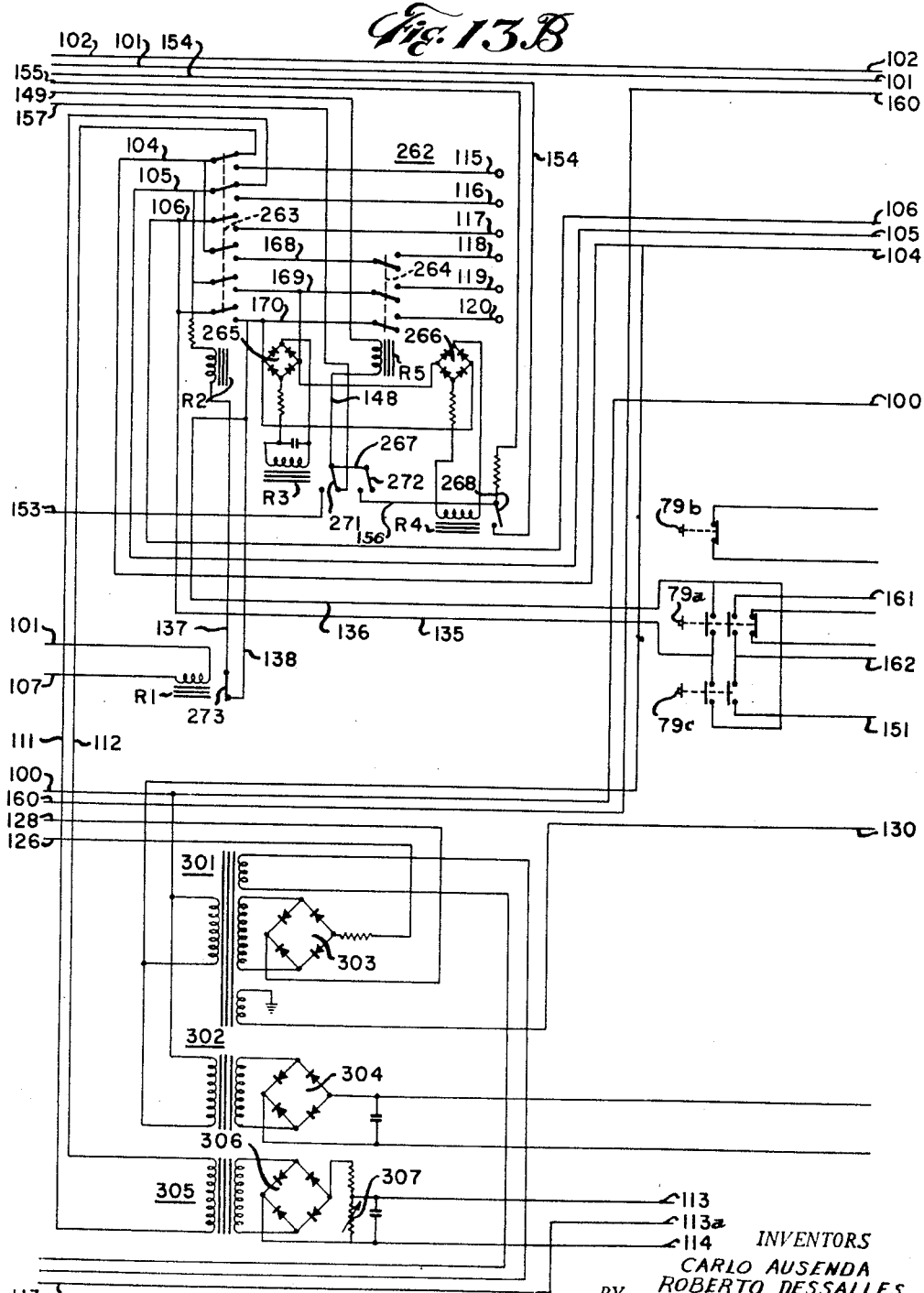

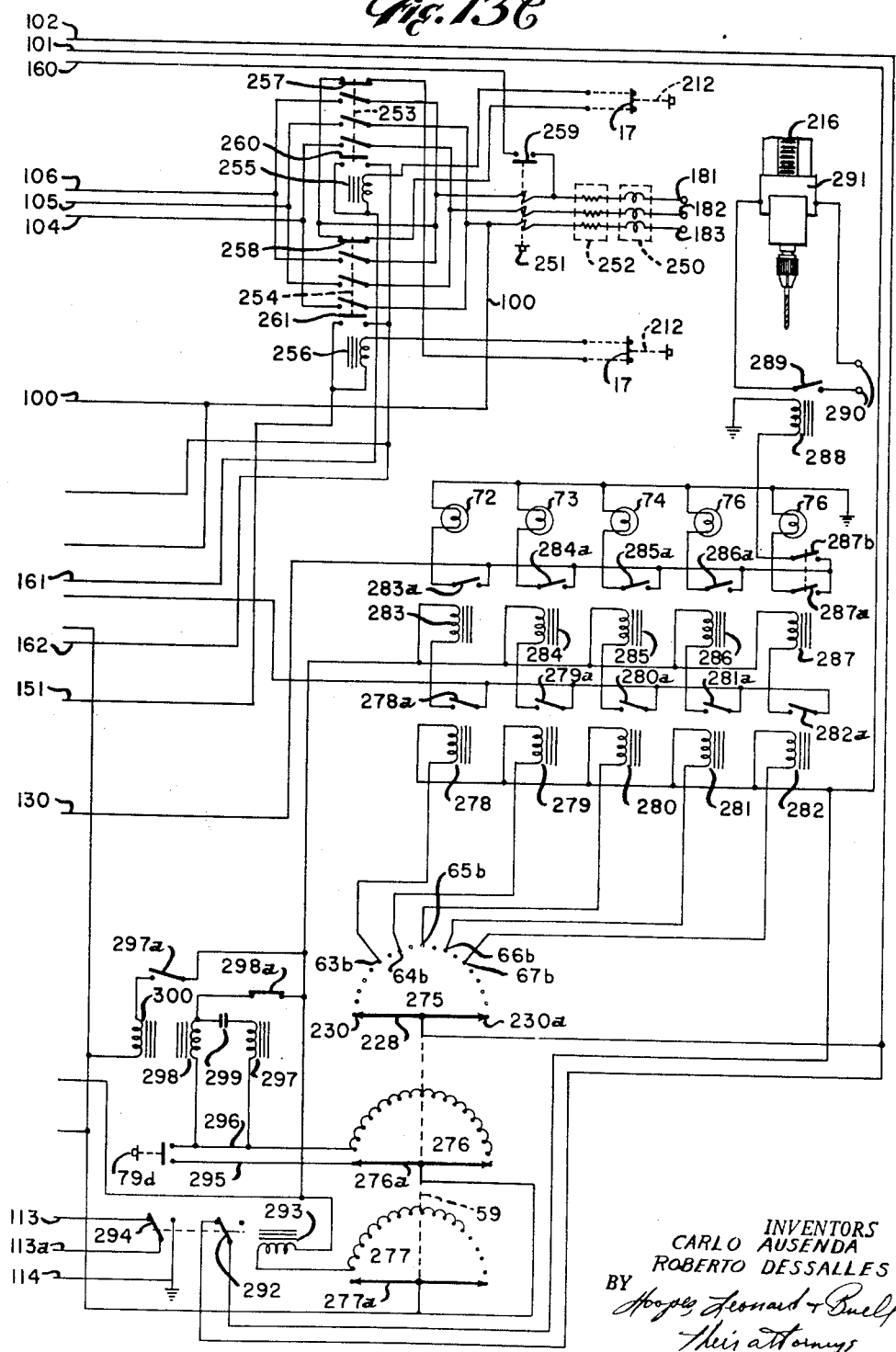

United States Patent Office 2,947,203
Patented Aug. 2, 1960

2,947,203

FABRICATION SYSTEM

Carlo Ausenda and Roberto Dessalles, Milan, Italy, assignors to Compagnia Italiana Forme Acciaio S.p.A., Milan, Italy, a corporation of Italy Filed July 7, 1954, Ser. No. 441,856

19 Claims. (Cl. 77—5)

This invention relates to apparatus and method for fabrication of work involving a combination of mechanical and light-sensitive electrical means. More particularly, this invention pertains to a new system utilizing a master tape with markings for control in combination with work carriage means, to regulate and index travel between operation stations and to select tooling means for work on said carriage.

By means of our invention, difficulties in various prior practices have been overcome. Thus, we provide a new fabrication system in which work is moved in controlled fashion relative to automatically operable tool means. In that relative movement, provision is made for precise indexing at such tool operation stations. Further, at each operation station, a due selection is made among available tools in accordance with the signal position and identification of a marked tape, which is made at that station with the aid of light-sensitive members. A further feature of our invention not only prevents over-running in the course of achieving precise indexing, but means are also provided for taking care of stations which are close to one another. In addition, for movements between stations farther apart, a plurality of motor means are capable of selectively effecting higher speed for the approach and lower speed for the final movement to index position at the next such station. Such high speed feature may also be utilized in a rapid return of the carriage means preparatory to a new working stroke. These with marked control tape and electrical circuit means in the new system cooperate to achieve a new kind of automatic and precise operation on work undergoing fabrication, and at greater economy, than has heretofore been considered practical.

Other features and advantages of our invention will be apparent from the following description and from the drawings, which are illustrative of one embodiment only, in which:

Figure 1 is a front view, in somewhat schematic form, of one embodiment of our invention;

Figure 2 is a plan view of the embodiment shown in Figure 1;

Figure 2A illustrates a hold-down modification which may be provided in the embodiment shown in Figures 1 and 2;

Figure 3 is a view of the embodiment shown in Figures 1 and 2 taken along line III—III of Figure 2;

Figure 4 is an end view of the embodiment shown in Figure 1 when looking at the left hand-end of that embodiment;

Figure 5 is a view of a new control head utilized in the embodiment illustrated in Figure 1;

Figure 6 is a plan view of the control head shown in Figure 5;

Figure 7 is a view of the control head shown in Figure 5 with the front cover thereof removed;

Figure 8 is a view taken along line VIII—VIII of Figure 7;

Figure 9 is a somewhat enlarged view taken along line IX—IX of Figure 8;

Figure 10 is a plan view of the lamp shield structure shown in Figure 9;

Figure 11 is a view taken along line XI—XI of Figure 7;

Figure 12 is a view of a perforated master tape utilized in the embodiment shown in Figure 1; and Figures 13A, 13B and 13C together constitute a single figure illustrating new electric circuit means utilized in the embodiment shown in Figure 1.

Referring to the drawings, an embodiment of our invention may comprise a rigid frame 1 of structural strength members secured together in cubical fashion. Said frame 1 may be affixed, for example, to the floor of a plant in which the new apparatus is to be used. Ways in the form of spaced parallel guide rails 2 are affixed to said frame 1 and extend, in the illustrated embodiment, from end to end thereof. Rails 2 are rigid and support a work carriage 4 having wheels 3 in direct engagement with the top of rails 2. As shown, wheels 3 are provided at the corners of carriage 4. Further pairs of wheels 3 between the ends of carriage 4 may be used on carriage 4 whenever it is long enough to warrant such to guard against "springing" of the carriage in the course of a tool operation on work 200 carried by carriage 4. Such work 200 may be in the form, for example, of a casting fastened to carriage 4 by suitable clamp means (not illustrated). Further, as illustrated in Figure 2A, hold-down rollers 201 may be connected by rigid brackets 202 to journals 203. Rollers 201 travel along the underside of a flange 2a in the modification shown in Figure 2A and may be utilized to insure against any tendency of carriage 4 to "jump" up in the course of any fabrication operation in the course of the use of our invention.

Generally, the mass of work 200 and of the new device provided herein will be sufficient for precision indexing and tooling without concern for "springing" or "jumping" or other relative movement of parts of the new invention when carriage 4 is at rest at a station where one or more selective tooling operations are to be performed upon the workpiece 200.

Arms 18 are rigidly secured to carriage 4 and extend outwardly toward the front of the new machine and downwardly as shown in Figures 1 and 2 to provide a rigid support for a master tape 23 having control markings which may be in the form of perforations 203. Clamp 21 abuts the outer and lower end of arm 18 and the jaws of clamp 21 may be tightened by a screw 204 in such a manner as to hold the left-hand end of tape 23 securely in position. In the abutment of clamp 21 against arm 18, tape 23 passes through an open ended slot 205 toward the other arm 18 where the right-hand end of tape 23 is secured between the jaws of clamp 22 by means of a screw 206. One of the jaws of clamp 22 is provided with a threaded stud 207 which passes through a hole in the right-hand arm 18 to be engaged by a nut 208a. A spring 209 is mounted between washers 210 and maintains tape 23 under a preselected tension to hold it taut in accordance with the amount that nut 208a is tightened up on stud 207a. Hence, during all movements of carriage 4, tape 23 moves in exact correspondence and acts as a control feature in the new fabrication system of this invention. A control head 39 has a slotted passage 42 from side to side thereof and open at the front through which tape 23 passes.

Carriage 4, in the illustrated embodiment, is provided with a downwardly projecting, centrally located bracket 8. A main motor 5 may be fastened to the underside of carriage 4 to drive a driven gear 6, by means of a motor shaft 206, the outer end of which is suitably supported in a bearing in bracket 8. A magnetic locking brake 15 is provided with motor 5 and connected so that upon energization of motor 5 through the wires 207, the locking brake 15 will simultaneously release motor shaft 206 to enable motor 5 to turn driver gear 6. Conversely, upon cessation of the flow of electric current in wires 207, brake 15 will simultaneously be applied, as by means of a spring, with sufficient force to stop and lock motor shaft 206 against further movement. Thereby, drive gear 6 and a driven gear 7 will also be locked against further movement. The wires 207 may be in a single flexible electrical conduit sheath and by means of a reel or pulley (not shown) be extended and retracted in the course of the movement of carriage 4 from one end of frame 1 to the other.

The lower end of bracket 8 is provided with a nut 208 journaled therein and keyed or otherwise affixed to a driven gear 7. The gear ratio between gears 6 and 7 is selected in accordance with the characteristics of motor 5, the new device and the service into which the new apparatus is to be placed. While nut 208 is rotatably supported in bracket 8, it is not capable of axial movement relative to bracket 8. Hence, when motor shaft 206 turns, the rotation of gear 7 rotates nut 208 and in turn makes nut 208 travel along a threaded screw drive shaft 9 in a direction depending upon the direction of rotation of nut 208.

Rigid bearing posts 11 are secured to frame 1 and are provided with bearings for the ends of threaded drive shaft 9. Collars 209 are provided on shaft 9 in such a manner as to permit rotation thereof without permitting axial movement of shaft 9 relative to frame 1. A flexible coupling 14 connects the left-hand end of drive shaft 9, in the embodiment shown, with a second drive motor 12 which is also used for precision indexing. Coupling 14 is connected to motor shaft 210 through a speed reducer 13, a suitable gear reduction ratio being provided therein. A magnetic locking brake 16 is also provided for motor 12 and, in the device illustrated, is rigidly mounted on frame 1 with the second motor 12, which is energized through wires 211 and the speed reducer 13. Locking brake 16 functions relative to motor 12 in the same manner that locking brake 15 functions relative to motor 5. Whenever motor 5 is stopped without a stoppage of motor 12 at the same time, motor 12 will rotate drive shaft 9 at a speed such that platform 4 will be moved along the rails 2 at a lesser speed than the higher speed which motor 5 is capable of alone providing when acting through gear 7 and nut 208. When motor 5 is stopped and nut 208 is locked against rotation by brake 15, the rotation of shaft 9 by motor 12 makes carriage 4 travel axially relative to drive shaft 9 by virtue of the inter-engagement of the male threads on shaft 9 with the female threads on nut 208. That travel is at a speed which is sufficiently slow to provide instant stoppage and indexing of carriage 4 when motor 12 is deenergized.

Further, in the illustrated embodiment, whenever main motor 5 is energized, secondary motor 12 will also be energized and operative to move carriage 4 in the same direction. Hence, the speed of carriage 4 will be at a maximum and the sum of the speeds respectively and differentially provided both by the rotation of nut 208 by motor 5 and by the rotation of shaft 9 in a supplementing direction by the motor 12. As and when motor 5 is de-energized, motor 12 will continue movement of carriage 4 in the same direction at its slower speed. Thus, when motor 12 is shut-off, the effect thereof is to precisely place the next signal station on tape 23, carriage 4 and work 200 at the exact next operation indexing position. An exception to the running of indexing motor 12 beyond a shut-off of main motor 5 occurs when carriage 4 reaches either extreme of its limit of travel on ways 2. At either extreme, carriage 4 trips a lever 212 of a limit switch 17. When either lever 212 is tripped, both motors 5 and 12 are de-energized and both brakes 15 and 16 are applied to stop the entire device where it remains at rest until movement in the opposite direction is initiated by an operator.

Frame 1 may be provided with rigid pillars 78 in fixed relation thereto, to form the standards to which a bridging beam 213 may rigidly be fastened above the path of travel of carriage 4 and work 200. Bridging beam 213 may have operating tools fastened thereto across such path. Thus, we have illustrated only one such tool, a drill press 214, of many that may be mounted on beam 213 for drilling, reaming, boring, counterboring, broaching and tapping operations to mention some of the possibilities. Indeed, in each of the transverse tooling positions extending along beam 213 and across the path of travel of carriage 4 above both the carriage and workpiece 200, either one or more than one tool may be arranged for automatic operation pursuant to the new means provided by this invention. Or, a series of rotary heads having a transverse axis generally parallel to the axis of beam 213 may be provided above work 200 with means for performing an entire series of tooling operations in each of the transverse tool mounting positions between the front and back of the work fastened to carriage 4. To return to drill press 214 which is shown solely as one of the possible exemplary tools, it may be provided with a drill 215 capable of being automatically rotated and moved downwardly and upwardly by a rack 216 when work 200 is indexed and stopped at a signal station on tape 23 calling for the selection of a tooling operation by drill press 214. Further, such an automatic operation of drill 215 will occur at every one of the operation stations for which master tape 23 is provided with a perforation in that ordinate position calling for the selection and operation of drill press 214.

An optical sight 77 may be provided in the front standard 78a so that a hair line will coincide with the transversing indexing line corresponding to the tape signal station along which the selected tooling operation or operations are to be performed on work 200. In that way, in setting up the new system for operation, the first of a multitude of identical pieces of work may be laid out on a layout table in the plant and clamped or otherwise affixed to carriage 4 in proper position relative to a master tape 23 having its perforations corresponding to the layout markings for tooling on that first workpiece. Then the new machine can be run with the tooling devices on bridging beam 213 switched off so that as the new system goes through the balance of its station cycle and adjustments made as in the longitudinal clamping of tape 23 until the hair line of sight 77 shows accurate correspondence between the axial alignment of tape 23 and those layout markings on the first workpiece. Thereafter the tools can be switched on and a working cycle begun on such first workpiece and subsequent corresponding ones.

Control head 39 has a lower casing portion 217 and an upper casing portion 218 respectively fastened to frame 1 by means of lugs 219 and 220. Some relatively slight amount of cushioning may be provided between frame 1 and casing 217—218, to center the opening 42 through the sides of head 39 relative to tape 23. A partition 41 extends across the upper part of lower casing part 217 immediately below kerf opening 42. Rollers 45 and 46 at the entry and exit sides respectively of head 39 project upwardly through partition 41 a sufficient distance to engage and position tape 23 in the course of its passage through slot 42 in control head 39. Upper rollers 45a and 46a are mounted in the upper casing part 218 and cooperate with rollers 45 and 46 respectively in such positioning of tape 23. Similarly, front and back positioning of tape 23 is provided with the aid of vertical pairs of rollers 47 and 48 as tape 23 moves through head 39. A front cover is provided in two sections 221 and 222 for head 39. Openings 223 may be provided through cover section 221 for ventilation purposes.

An electrical stepping relay mechanism 61 extends forwards from the casing and is mechanically connected to a rotatable lamp shield 62. A bracket 224 is fastened to cover section 222 and supports an arcuate bracket 225 in which the outer end of the stepping relay shaft 59 is journaled. The inner end 59a of shaft 59 is connected to outer end 59 by a flexible coupling 226. Shaft 59a is bushed at 227 and directly connected to shield 62 to both support that shield in concentric relation to a lamp 44 and to rotate that shield 62 step-by-step when the new system calls for such action. As stepping mechanism 61 acts, it swings an arm 228 in step-by-step relation across radial contacts 229 in a sector swept by arm 228. Arm 228 carries brushes 230 and 230a and at each step of the stepping relay action, a tool or tools in the circuit closed between a brush or arm 228 and a fixed radial electrical contact 229, is energized. The time required at each operation station for a tool like drill press 214 to engage the work, complete the operation and return to starting position may be taken care of, for example, in the circuit timing inasmuch as the work 200, carriage 4 and tape 23 will respectively remain at rest in their respective corresponding operation and signal stations until each of the selective tool operations for that station has been completed by the swinging of arm 228 through 180 mechanical degrees. Upon brush 230 or 230a as the case may be, passing the terminal end of the radial contacts 229, the stepping relay will stop with its brushes in position as shown in Figure 13C for the next station operation.

Master tape 23 may be made of flexible plastic or steel strip or other suitable material. Minute perforations 203 are punched through the tape or otherwise provided in accordance with the longitudinal and transverse spacing of the individual toolings to be performed upon a work piece like work 200. These perforations may be in size of the order of a fraction of a millimeter and yet be sufficient in size for a light-sensitive operation controlled in the new system by such a tape 23. In Figure 12, it will be noted that sufficient perforations are provided in longitudinal planar alignment with one or more of the spirally arranged tool selector openings 63c to 67c inclusive through each cylindrical half of shield 62, to perform the desired fabrication.

In that illustrated embodiment, the longitudinal or abscissa lines along tape 23 may be respectively numbered 63a to 67a. A working stroke in the illustrated embodiment extends from left to right when viewing Figure 1. An ordinate signal station is reached on tape 23 each time one or more perforations 203 occurs in transverse alignment perpendicular to the longitudinal axis of tape 23 and to the imaginary abscissa lines 63a to 67a inclusive. As an example only, tape 23 has 5 such abscissa lines. Each perforation 203 along any abscissa 63a to 67a will produce a separate signal and tool operation as and when each perforation is utilized in energizing a phototube 53 in control head 39. Thus, if by way of illustration the tape 23 shown in Figure 12 is provided, between clamps 21 and 22, only with perforations as shown in Figure 12, there will be a signal and operation station occurring at each of the transverse lines which may respectively be numbered 231 to 237 inclusive. Moreover, when tape 23 is stopped at station 231, control head 39, carriage 4 and work 200 will be stopped at the same operation station for precise tooling by tool members on beam 213. Furthermore, while the new device is held by brakes 15 and 16 at rest at station 231, tooling operations will occur in sequence by virtue of the transmittal of light permitted by the single perforation 203 at the intersection of lines 231 and 63a; a second tooling operation will occur by virtue of the perforation 203 at the intersection of lines 231 and 64a; a third tooling operation will occur by virtue of the perforation at the intersection of lines 231 and 65a; a fourth tooling operation will occur by virtue of the perforation 203 at the intersection of lines 231 and 66a; and a fifth, which in the instant embodiment may be used to operate drill press 214, will occur by virtue of the perforation 203 at the intersection of lines 231 and 67a. The tooling operations at station 231 and at the other stations are initiated in each instance, after carriage 4 has stopped, by the pressing of a scanning button 79d which sets stepping relay mechanism 61 in motion and commences the rotation of scanning shield 62.

Upon completion of the tooling operation at station 231, an operator, inasmuch as the illustrated embodiment is semiautomatic rather than fully automatic, will press a forward button 79a to speed tape 23, carriage 4 and work 200 to the next signal and operation station corresponding to line 232 where the only tooling operation performed will be that selected by perforation 203 at the intersection of lines 232 and 63a. Similarly, after each station cycle button 79a will be pressed and tape 23, carriage 4 and work 200 will speed to the positions represented in turn by ordinates 233, 234, 235, 236 and 237. At station 237, five tooling operations as regulated by the five perforations will again occur in succession in the manner of the toolings at station 231 except that at station 237 a different part of work 200 is presented for such tooling operations. It will be evident that a master tape 23 may be readily punched for various desired combinations of placements and sequences of fabrication operations. Since a tape 23 may be accurately punched for control and readily adjusted and affixed, the new device will readily perform tooling operations on work with a vast improvement in accuracy and economy. In some cases, after work has been fabricated in the course of one working stroke of carriage 4, it may be returned to its starting position for a new series of tooling operations in accordance with a new selection of a tape 23 for the succeeding series of operations on the same work. Thus, an operator may readily and semiautomatically effect, control and change precision fabrication on work of different kinds and masses attached to carriage 4. Further, there is no limitation as to the kinds of tools that may be adapted for operation with the cooperating elements of this new system.

Immediately in advance of control head 39, an air blower 30 may be utilized to blow air downwardly against the top of a tape 23 and through the perforations 203. Thereby, lint or dirt that may have tended to clog a perforation 203 is blown away in advance of the "reading" of tape 23 inside control head 39. Effluent air from the lower part 40 of blower 30 passes into a discharge pipe 40a which may be conducted into the interior of the upper portion 218 of head 39 to cool light source lamp 43 and the light source lamp 44, the air from thence passing to the outside. Inside control head 39, lamps 43 and 44 are affixed to sockets attached to the rear wall of casing 218.

Partition 41 covers the top of lower casing part 217 except for three transversely extending apertures 238, 239 and 240. The long dimension of each of those apertures is such that every perforation on tape 23 will pass above each of said apertures as tape 23 moves relative thereto. Lamp 43 is positioned above aperture 238 to shine therethrough whenever there is any perforation 203 above aperture 238. Upon each passage of a perforation over aperture 238, a phototube 52 is energized. A blinder 58 fits around phototube 52 to limit light received thereby to that transmitted through one or more perforations 203 as each is above aperture 238. Broader aperture 239 and aperture 240, in the illustrated embodiment, utilize lamp 44 as a light source for phototubes 54 and 53 respectively whenever perforations 203 in tape 23 and openings in shield 62 are in alignment with such apertures respectively. A phototube 54 receives impulses that may be transmitted from lamp 44 through aperture 239 and is provided with a blinder 58a to keep stray light from entering. On the other hand, phototube 53 receives any light from tube 44 that may be transmitted by registry of openings in tape 23 and shield 62 with aperture 240. A blinder 58b is utilized to keep stray light from affecting phototube 53.

Upon passage of any light through apertures 238 or 239 respectively to phototubes 52 and 54, main motor 5 is deenergized and its brake 15 applied thereby quickly slowing the speed of carriage 4 down to the speed produced by secondary or indexing motor 12. Then, when a station ordinate is in vertical registry with aperture 240 the energization of phototube 53 will instantly stop motor 12 and apply locking brake 16 to stop tape 23, carriage 4 and work 200 instantly without overrunning regardless of the mass or bulk of work 200, or of the inertia of the new machine. Upon such station indexing and stopping of tape 23 and carriage 4, work 200 is ready for tooling operations corresponding to the number of actuation perforations in the station ordinate then in indexing position above aperture 240. An operator will then push selector scanning button 79d to initiate action of the stepping relay 61 and shield 62. Once started, stepping relay mechanism 61 will continue through 180° of rotation and shield 62 will successive and in synchronism scan the station ordinate intersection with each of the imaginary lines 63a to 67a. As described above, if that scanning is performed at the station corresponding to transverse line 233, opening 64c after opening 63c has passed by, will register with the perforation 203 at the intersection of lines 64a and 233 to energize phototube 53 and complete a tooling operation circuit through the second operative tooling step 64b on the stepping relay, as shown on Figure 13C. Upon completion of all of the station stops and of the tool operations at each of those station stops, an operator will usually press a return button 79c, whereupon both reversible motors 5 and 12 will return carriage 4 to starting position at the combined speeds of those motors in the return stroke direction. After the pressing of button 79c, carriage 4 will continue moving to the left as shown on Figure 1 until carriage 4 strikes the left-hand limit lever switch 212 stopping both motors and bringing the carriage to a halt, unless prior to reaching the extremity of its return stroke, the operator stops the carriage by pressing stop button 79b.

After returning to a starting position at the left in the illustrated embodiment and stopping, a new working stroke for carriage 4 and the new device may be readied by taking off the fabricated work and mounting a new workpiece on carriage 4, or by changing the tape 23, or by shifting tape 23 relative to the existing work if there is to be a second round of fabrication operations thereon. When the new device is again readied, the operator will press button 79a and start a new fabrication cycle. If a number of identical pieces have to be fabricated in the same way, the new system lends itself to rapid production in a way heretofore not available.

The buttons 79 may be mounted on a panel desk 71 rigidly affixed to frame 1 adjoining control head 39. Signal lights 72–76 inclusive may also be provided on desk 71 to indicate the actuations of phototube 53 for respective tooling operations occurring by virtue of perforations respectively on any of the lines 63a–67a at each operation station. Terminal connections 241 and 242 and others may be provided upon control head 39 and elsewhere for circuit test and adjustment purposes. In installing a new device made in accordance with this invention, braking times and mass effects of the new apparatus may either be calculated or empirically tried out to set up the new apparatus and ready it for fabrication operations with due allowance for the characteristics of the parts of the new apparatus. Furthermore, the smaller the diameter of the perforations in a tape 23, the greater the precision that will be obtained particularly when taken in conjunction with the vernier character of the lower speed provided by the secondary motor 12. Indeed, indexing accuracies of the order of one one-thousandths of an inch may be achieved by means of the new apparatus and system. Moreover, in a scanning operation performed through the pinholes in shield 62, no actuation will occur unless the indexing station ordinate precisely overlies aperture 240, the width of which 240 may be no wider than the diameter of the perforations in a tape 23. Thereby, shield 62 serves to double check both the accuracy of the stopping and of the positioning. Still further, respective parts may be differently arranged without departure from the teaching of this invention. For example, main motor may be mounted on frame 1 while secondary motor 12 and drive shaft 9 may be connected to carriage 4.

The illustrated embodiment of our invention includes an electronic circuit illustratively depicted in Figures 13A, 13B and 13C which in side-by-side arrangement from left to right constitute but a single figure without interruption across the side margins of the respective drawing sheets of the electric wire connectors bearing the same reference numerals.

Terminals 181, 182 and 183 and the connectors leading therefrom may indicate a three-phase source of power of appropriate voltage. A magnetic coil structure 250 in each of those connectors may provide a fast-acting overload device to open a main switch circuit breaker 251 in the event, for example, of a sudden voltage surge in any of the lines. Each of the line connectors to the power source may also be provided with a thermal resistance protective device 252 which is generally slower acting to open the breaker 251 in the event of continuing excess current flow in any of the line connectors to a power terminal 181 to 183. The power line connectors in turn are connected to the movable contacts, in the illustrated embodiment, of a working stroke relay gang switch 253 and to the movable contacts of a return stroke gang switch 254 in a reversing order. Switch 253 is responsive to a working stroke relay 255 while the movable contacts in switch 254 are responsive to a return stroke relay 256. The movable contacts in question are normally open, suitable biasing being provided as by means of a spring in each case. When the movable contacts in question are open, a contact 257 is normally closed in switch 253 in the circuit of the terminal limit switch at the end position of the working stroke, said terminal limit switch being limit switch 17 at the right-hand end when looking at Figure 3 of the drawings. Similarly, when the movable contacts in switch 254 are open, a contact 258 in the circuit of the terminal limit switch 17 at the end position of the return stroke, at the left-hand end of Figure 3, is closed. The limit switches 17 are normally closed until opened by engagement of carriage 4 with one or the other levers 212 respectively.

With the switches 253 and 254 in the position shown in Figure 13C, the entire device is stopped and at rest with the brakes 15 and 16 respectively in applied locking position relative to the motors 5 and 12. The main switch 251 is normally closed and must also have its contact 259 closed if there is to be any operation of the new device. Normally, open contact 260 in switch 253 is a seal-in contact for a working stroke operation, after button 79a has been pushed and released, following the initiation of a full or partial working stroke until either main switch 251 is opened or stop button 79b is pushed to de-energize controller 255 or the upper "working stroke" limit switch 17 in Figure 13C is opened to deenergize relay 255 thereby stopping the device. Correspondingly, contact 261 is a seal-in contact for a full or partial return stroke, after button 79c is pushed and released, to hold the new device in return stroke operation until either main switch 251 is opened or stop button 79b is pushed or the lower "return stroke" limit switch 17 in Figure 13C is opened when carriage 4 reaches its left-hand extremity of movement as seen when looking at Figure 3.

The connectors 104, 105 and 106 respectively lead from the circuit structure comprising a remote controller controlling the relays 255 and 256, into a motor control relay structure 262. A gang-connected series of six movable contacts 263 has the upper set of three connected to terminals 115, 116 and 117 to which wires 211 are respectively connected to energize lower speed motor 12 when that motor is in an energized circuit. Similarly, the lower set of three movable contacts on gang switch 263 has connectors 168, 169 and 170, to terminals 118, 119 and 120, respectively. The terminals 118, 119 and 120 are respectively connected in turn to the leads 207 for main motor 5 for the operation thereof when the terminals in question are energized. Connectors 168, 169 and 170 are placed in circuit through a movable switch gang-connected contact 264 having a relay R5 which when energized holds gang switch 264 open against its bias toward closed position. Relay R2, on the other hand, controls the movable gang switch 263 biased to open position. Hence, by means of relay R5 and switch 264, main motor 5 can be disconnected from the circuit, as will appear, while secondary motor 12 continues to operate during the energization of relay R2.

A copper oxide rectifier 265 for a relay R3 and a second copper oxide rectifier 266 for a relay R4 are connected across lines 169 and 170. A capacitance connected in shunt with time delay relay R3 provides a timing delay for main motor 5, relay R3 controlling the movable contacts of gang switch 267, normally biased to the position shown in Figure 13B. On the other hand, relay R4 controls normally open movable contact 268. Relay R4 may be a copper slug timing relay to prepare for the firing of thyratron 269 by closing contact 268 in the same manner that the firing of thyratron 270 is prepared for by the closing of movable contact 271, when the coil of relay R3 is energized, to bridge the open connection between connectors 148 and 153. When that bridging is effected, movable contact 272 closes a circuit between connectors 148 and 156 in series with a circuit between connectors 156 and 154 when movable contact 268 is also closed. The relative selection of the characteristics of relays R3 and R4 is such that relay R4 is operative in advance of relay R3 in the course of an operation during a working stroke. Thus relay R4 may have a time delay of about one-tenth of one second while the delay of relay R4 may be about two-thirds of one second. A movable contact 273 normally closes a circuit through the coil of relay R2 until opened by the energization of a control relay R1. When contact 273 opens, the movable contacts of switch 263 return to the position shown in Figure 13B in which event motor 12 is instantly stopped by the locking brake 16, the motor 5 having previously been stopped in the course of a working stroke by the firing of thyratron 274 to stop the main motor 5 through relay R5. Whenever movable contact 273 is opened by control relay R1, the relays R3 and R4 are also immediately returned to the conditions shown in Figure 13B. The actuation of control relay R1 depends upon the firing of the gas discharge tube 274 which may be a standard thyratron having type 2050 characteristics. Thyratrons 269 and 270, on the other hand, may be type PL21. When thyratron 274 fires, after scanning starts, current passes through connectors 107 and 101 so that when a brush 230 or 230a is in contact with one of the tool mechanism operation positions 63b, 64b, 65b, 66b, or 67b, in the illustrated embodiment, a tooling operation or sequence of operations at that position will take place.

Stepping relay mechanism 61 may comprise three sectors 275, 276 and 277. The first sector is provided with the radial fixed contacts 63b to 67b inclusive (among the contacts 229), which contacts 63b to 67b are respectively connected to particular tool relays 278 to 282, inclusive, which control contacts 278a to 282a, inclusive. Contacts 278a to 282a, inclusive, are normally biased open and when selectively closed, energize secondary tool relays 283 to 287, inclusive, respectively. Relays 283 to 287, inclusive, actuate normally open movable contacts 283a to 287a. As shown in Figure 13C, signal lights 72 to 76, inclusive, are in the circuit with movable contacts 283a to 287a, inclusive, respectively. In addition, as shown for the fifth position 67b in a clockwise direction on sector 275, movable contact 287 is ganged with a second movable contact 287b, as an illustration of one possible circuit connection, whereby a drill press 214 may be operated automatically from a support like bridging beam 213. Thus, when brush 230 or 230a is in contact with fixed contact 67b, the closing of contact 287a and 287b also energizes relay 288 in addition to signal light 76, thereby closing through a movable contact 289, the circuit which energizes the motor of drill press 214 and feeds rack 216 down and up at a preselected speed. Energy for the rotation, feeding and retraction of drill press 214 are provided through terminals 290. An individual switch may be placed in the actuation circuit of drill press 214 if desired. The feeding and retraction cycle may be controlled by a suitable reversing device in a control box 291 in drill press 214.

At each of the other positions corresponding to a signal light, a tool or tools of suitable character for the work to be performed on workpiece 200 may be mounted and operated by virtue of the master control achievable through this invention. Thus, in some cases, an energized circuit through the contacts of the stepping relay may be utilized to operate a pair of tools in each of the tool operation positions. Although but five such positions are shown and discussed in the illustrated embodiment, it is evident that various permutations and combinations of positions and tools may be effected in carrying out this invention.

A normally closed movable contact 292 is interposed in the circuit of the brushes 230 and 230a and subject to the control of relay 293 which also controls a movable contact 294 normally in contact with line connector 113. Relay 293 is a relay which may utilize a copper slug and is energized only when a brush of arm 277a is on one of the jumpered stepping relay contacts in sector 277. Until normally closed contact 292 is opened by relay 293 tool operations cannot begin since contact 292 acts as a short-circuiting contact when closed. The energization of the coil in relay 293 also moves movable contact 294 into circuit with connector 114 and breaks the circuit with connector 113 thereby reducing the negative bias on thyratron 274 which then permits thyratron 274 to fire each time a light impulse reaches phototube 53 through one of the pinholes 63c to 67c in shield 62. As soon as arm 277a moves off a jumpered contact in sector 277, relay 293 is de-energized and no firing of thyratron 274 can again occur for tooling operations until relay 293 is again energized. As shown, sector 277 is jumpered around the entire portion of the stepping relay mechanism utilized for tooling operations in the illustrated embodiment. In sector 276, on the other hand, all of the radial fixed contacts thereof are jumpered together to provide stepping through 180°. The three sectors with their respective brush arms are insulated one from the other, as illustrated in 13C, except to the extent joined electrically through the illustrated circuit connections.

When tape 23 and carriage 4 come to rest at an operation station, the stepping relay mechanism 61 will be in the position shown in Figure 13C. Then, when an operator pushes scanning button 79d which momentarily closes the circuit through connector lines 295 and 296, first relay 297 and then relay 298 will operate. Relay 297 controls normally open movable contact 297a which will be closed causing current to energize a latching relay 300, thereby preventing the brush arms on shaft 59 in the three sectors of stepping relay 61 from moving in a direction counter to the clockwise direction indicated for them in Figure 13C. At the same time, closing of movable contact 297a will advance the brush arms 228, 276a and 277a one step or position. During the energization of relay 297, condenser 299 will be charged through the coil of that relay. After a short period of time, a relay 298 will act opening movable contact 298a which moves the brush arms 228, 276a and 277a an additional step in the stepping relay mechanism and allows condenser 299 to discharge through the coil of relay 298, thereby keeping contact 298a open. Upon completion of discharge by condenser 299, relay 298 becomes de-energized and movable contact 298a returns to its normally closed position, thereby initiating the next step of the stepping cycle which will continue until the brush arms 228, 276a and 277a and shaft 59 are swept through 180 mechanical degrees. Each closing of contact 297a and each opening of contact 298a causes the brush arms to advance a single step as will be readily understood by those skilled in the stepping relay art. The opening and closing of each of movable contacts 297a and 298a in alternative sequence will cause the brush arms 275a, 276a and 277a to rotate between the fixed radial contacts in their respective sectors in synchronism since all are connected to shaft 59 and in accord with the timing provided by the relays 297 and 298.

In the foregoing circuit, a transformer 301 has its alternating current primary in single phase across the power line connectors 182 and 183 through the lines 100 and 104 in the course of operations during a working stroke. A second transformer 302 has its primary similarly connected. The secondary on transformer 301 is connected by connectors 139 and 140 to electronic circuit of phototube 53. A second winding on the secondary of transformer 301 is connected to a copper oxide rectifier 303 which supplies direct current through connector lines 126 and 128 to the filaments of lamps 43 and 44. A third winding on the secondary of transformer 301 is connected as shown to circuits between the relays 283 to 287 and their respective movable contacts. The secondary of transformer 302 supplies a rectifier 304 which in turn provides direct current for the relays 293, 297, 298 and 300. A third transformer 305 has its primary energized through connector lines 111 and 112 whenever gang switch 263 is in the position shown in Figure 13B through one side or the other of the remote controller when stroke relay 255 or return stroke relay 256, as the case may be, is energized. The secondary of transformer 305 provides current which is rectified by a rectifier 306 to provide a negative direct current bias for the thyratron 274 to prevent its firing when switch 263 is open except in response to tooling operation impulses received by phototube 53 after contact 294 is moved into connection with connector 114. A variable rheostat 307 adjustably controls the bias on the control grid of the thyratron 274 when movable contact 294 is in the position shown in Figure 13B.

A further transformation occurs in the transformers 308, 309 and 310, the primaries of which receive single phase power from power connectors 181 and 183 through line connectors 160 and 100. In transformer 308, one secondary coil 311 provides direct current voltage through connector 149 and relay R5. The remainder of the transformer secondary is in an amplifying circuit for phototube 52. Thus, when phototubes 52 receive a light impulse from lamp 43 through one or more perforations in tape 23 on an ordinate line, such light passes through aperture 238 which such perforation or perforations overlie that aperture. This signal or response of phototube 52 may be amplified by a pentode 312 and a duo-triode 313 in an amplifying circuit with the thyratron 270. Impulses from lamp 44 which pass through shield 62 when an opening in that shield is in registry with one or more perforations in tape 23 overlying aperture 239 actuate a light-sensitive phototube 54, which sends out a signal or response amplified by a pentode 314 and duo-triode 315 in circuit with thyratron 269. A secondary winding 316 of transformer 309 provides positive voltage for the plates of the amplifying tubes of amplifiers 312 to 315, inclusive.

When light from lamp 44 passes through an opening in shield 62, in alignment with one or more perforations along a transverse ordinate line in master tape 23 overlying aperture 240, phototube 53 will receive an impulse which is amplified by pentode 317 and duo-triode 318. One side of each of the duo-triodes in the three amplifiers in Figure 13A may be provided with a variable reference or noise cancelling signal 319. The amplifying tubes for phototube 53 are also in circuit as shown with thyratron 274 and transformer secondary winding 320 through rectifier 321 and connector 102 is in circuit with brush or sector arm 228 of sector 275. The dimensions of each opening 68 in the shield 62 are such that light passing through either opening 68 from the filament of lamp 44 will pass both through apertures 239 and 240 whenever perforations on tape 23 are in alignment with such apertures. Moreover, the rotation of shield 62 will take place in synchronism with the step-by-step rotation of shaft 59 as the brushes or sector arms of sectors 275 to 277, inclusive, move from fixed radial contact to fixed contact in the stepping relay mechanism 61.

In order to exemplify manifold features and advantages of our new fabrication system, let it be assumed, for example, that the new structure at rest with an unloaded carriage 4 stopped somewhere between the limit switches 17. Generally speaking, main switch 251 will be closed and remain closed until there is an occurrence actuating the circuit breakers 250 or 252. If button 79c is pushed to close momentarily the two movable contacts thereof, it will complete a circuit through connectors 135 and 136, connectors 137 and 138, normally closed movable contact 273 and will energize relay R2. In addition, relay 256 will be energized so that the reversible "lower speed" motor 12 will receive current through the terminals 115, 116 and 117 and begin to turn in the "return stroke" direction. Thereby, shaft 9 will be rotated to drive nut 208 and bracket 8 in a return stroke direction toward limit switch 17 at the left-hand side of Figure 3 in the illustrated embodiment. The starting of motor 12 by the closing of the movable contacts in gang switch 263 under the influence of relay R2 breaks the circuit through connectors 111 and 112. At the same time, rectifiers 266 and 265 are placed in circuit respectively for relay R4 which is energized first and for relay R3 which is energized a little later. Upon due elapse of time for the satisfaction of the time delay characteristic of relay R3, it closes placing connector 154 in circuit with connectors 156 and 148, placing connectors 143 and 153 in circuit and breaks the circuit with connector 147. Thereupon, relay R5 is de-energized enabling the biasing of gang switch 264 to return its movable contacts to establish circuit connections 168—118, 169—119 and 170—120, causing the instant release of brake 15 and starting of motor 5 in the same return stroke direction as the rotation of secondary motor 12. When contact 271 is in its at rest position, as shown in Figure 13B, relay R5 is constantly energized through transformer secondary 311. Motors 12 and 5 return carriage 4 without interruption even though button 79c is released immediately after it is pressed moving its movable switch contacts out of contact with the circuit connectors 136 and 151, until either stop button 79b is pushed to break the circuit through relay 256 and returning the system to its full at rest condition, or until carriage 4 strikes the left-hand limit switch, as seen on Figure 3, which also breaks the circuit through relay 256.

With carriage 4 stopped in a loading position, a workpiece 200 may be positioned thereon and immovably fastened to carriage 4. At the same time, a master tape 23 is inserted and positioned between clamps 21 and 22 unless a tape 23 corresponding to the tooling operation to be performed on workpiece 200 is already in place between those clamps. The insertion and removal of a tape 23 is quickly and readily performed whenever any change is to be made. Further, the perforating and spacing of perforations on a tape to be used in our new system can readily and accurately be performed. A suitable tape may be opaque and made of a suitable material like stainless steel with pinhole perforations of the size of a few one-tenths of a millimeter in diameter. Further, although the illustrated tape 23 moves equal distances with carriage 4 and work 200, our new system may also employ the same principle utilizing a tape of different length which is perforated in a similar preselected pattern and moved longitudinally in proportion to the length ratio which it bears to the length of the carriage. Thus, a control tape having one-half the length of a carriage in a modification of our new device would have its perforated signal stations one-half the distance apart that the corresponding operation stations are apart on the carriage and the proportional movement of such a control tape would be one-half the movement of such carriage.

With work 200 affixed to carriage 4 and the selected master tape 23 in position between clamps 21 and 22 which for purposes of this operative example will be assumed to correspond to the tape 23 illustrated in part in Figure 12, the man operating the new system will then push "forward" button 79a. Thereupon, connectors 135 and 136 are placed in circuit and connectors 161 and 162 are placed in circuit with the consequence that relay 255 is energized bringing gang switch 153 down and sealing in the forward or working stroke circuit through contact 260. At the same time, relay R2 is energized thereby starting the secondary motor 12 but, in this case, with the rotation thereof in a "working stroke" direction toward the right-hand end of the new structure, as it appears in Figure 3. Again, relay R4 is first energized and then relay R3 is energized. Energization of relay R4 closes movable contact 268 placing connector 154 in circuit with connector 155 through a resistance 322 which will ready thyratron 269 for firing upon phototube 54 receiving a light impulse from lamp 44 through aperture 239 during a working stroke. Upon the energization of relay R3, relay R5 is deenergized closing the circuits to main motor 5 and starting that motor also in a "working stroke" direction.

During the movement of carriage 4 with work 200 thereon toward the extreme right-hand end of apparatus, no impulses are received by phototubes 52, 54 or 53 whenever the light from lamps 43 and 44 is cut off from those phototubes by an unperforated portion of the master tape 23 overlying the apertures 238, 239 and 240 respectively. Movement of carriage 4 continues until signal ordinate line 231 reaches narrow aperture 238. Thereupon, phototube 52 receives an impulse from lamp 43 through the perforations on line 231. That impulse is amplified and fires thyratron 270 re-energizing a circuit from the anode of thyratron 270 through connector 153, movable contact 271, connector 148 and relay R5 instantly de-energizing main motor 5 by opening switch 264. The rapid braking of motor 5 by fast-acting brake 15 greatly decelerates the forward or working stroke movement of carriage 4 and work 200 which continues at the index vernier pace of secondary motor 12. Motor 12 remains energized until the perforations along the signal ordinate line 231 pass above wider aperture 239 and come into alignment with narrow aperture 240. Thereupon, light from lamp 44 passing through the opening 68 and aperture 240 sends an impulse to phototube 53 which fires thyratron 274 and energizes relay R1 breaking the circuit through relay R2 by opening movable contact 273. Immediately, switch 263 returns to its at rest position as shown in Figure 13B without however de-energizing the coil of relay 255, and secondary motor 12 is instantly braked in precise indexing position, with the work ready for a selector scanning search and tooling operation via shield 62 and stepping relay mechanism 61.

In the illustrated embodiment, each of the openings 68 in shield 62 is sufficiently large to take care of passing light through both of the apertures 239 and 240 when perforations in a tape 23 overlie one or the other or both of such apertures. As the perforations in line 231 passed across aperture 239, the impulse which phototube 54 received was superfluous inasmuch as relay R5 had already been energized through the impulse transmitted to disconnect main motor 5 before the perforations in line 231 reached wide aperture 239. Moreover, regardless of the mass and weight of carriage 4 and of workpiece 200, even if main motor 5 is running at maximum speed with the new system under the worst possible load condition when a perforation passes over aperture 238, the distance between aperture 238 and aperture 240 will always be greater than the maximum distance required in which to brake main motor 5 to a stop. The deceleration provided by stopping main motor 5 coupled with the slower speed of motor 12 is such that upon the signal perforation or perforations on the signal ordinate reaching aperture 240, despite its narrow width, there will be an instant stoppage and blocking of carriage 4 and work 200 at precise indexing position. Thereupon accurate tooling by the selected one or more of the tools, for example, on bridging beam 213 can take place.

With both motors off and the structure at rest in indexing position by virtue of the alignment between the perforations in line 231 and aperture 240, the man operating the new system will then push the tool selector or scanning button 79d. Thereupon, the stepping relays 297 and 298 begin the step-by-step rotation of shaft 59 and of brush arms 228, 276a and 277a from fixed radial contact to fixed radial contact of the respective sectors 275, 276 and 277. For the signal station along the transverse line 231, the intermittent angular rotation of shaft 59 will rotate shield 62 in clockwise direction as shown in Figure 13A bringing pinhole 63c into alignment with perforation 231a and aperture 240 when brush 230 or 230a is in engagement with contacts 63b. Thereupon, signal light 72 will light and a tool operated through relay 283 will perform its portion of the fabrication on work 200 at the indexing location corresponding to perforation 231a and to aperture 240. A plane perpendicular to tape 23 and partition 41 which includes imaginary line 63a will also include the axes of both pinholes 63c in shield 62; a parallel plane including line 64a will include the axes of pinholes 64c; a parallel plane including line 65a will include the axes of pinholes 65c; a parallel plane including line 66a will include the axes of pinholes 66c; and a parallel plane including line 67a will include the axes of pinholes 67c. For representation purposes, Figure 9 shows all of such pinholes, although in actuality, such pinholes are in helical or spiral arrangement around the half cylinders of shield 62 between the openings 68.

When the first step is taken by stepping relay 61, slow-acting relay 293 is energized, moving contact 294 into circuit connection with connectors 113a and 114 and opening contact 292, after a short period of time, to enable thyratron 274 to fire and energize the selected relay in the group 278 to 282 as each pinhole in shield 62 comes into registry with its corresponding perforation on line 231. Thus, when arm 228 was in engagement with contact 63b, the registry of pinhole 63c with perforation 231a fires thyratron 274 to operate relay 278 and close contact 278a to turn signal light 72 on and initiate a tool operation through relay 283 and contact 283a. Each of the tooling steps will operate in the same manner, the last being when arm 228 engages contact 67b when pinhole 67c transmits a light impulse from lamp 44 through perforation 231e and aperture 240 to phototube 53 for a final tooling operation at that ordinate location by drill press 214 through relay 287, gang contact 287b, relay 288 and contact 289. It will be realized that the signal lights 72 to 76, inclusive, may be omitted without interfering with indexed tooling operations that are performable by our new invention. Further, it is also feasible to use electrically operated means for counting the fabrication operations that occur at each station if such is desired. Indeed, such counting means may also be used in conjunction with a visual or audible alarm signal for any failure or trouble that may interfere with normal functioning of the new system and thereby eliminate need for inspection.

As the stepping relay mechanism 61 moves past the five tool selector positions 63b to 67b, inclusive, slow-acting relay 293 is de-energized returning movable contacts 292 and 294 to the positions shown respectively in Figure 13 thereby recycling thyratron 274 to ready it for the next motor stopping, indexing, tool selection and operation cycle at the next operation station corresponding to ordinate line 232. Upon completion of the five tooling operations, provided by the five perforations on line 231, and the return of the sector arms to the positions shown in Figure 13C, the new system, in the illustrated embodiment, is at rest and the man operating the machine will repush button 79a to restart carriage 4 in its working stroke direction through the energization of relay R2 and the starting of secondary "lower speed" motor 12. Then relay R4 will act to preset thyratron 269 to be followed by the action of relay R3 which will allow switch 264 to close and start main motor 5. The action of relay R3 will also put both thyratrons 269 and 270 in the circuit of relay R5. With both main motor 5 and lower speed motor 12 running, carriage 4 will be moved toward the next station 232 at the combined speed of both motors, unless upon energization of relay R3, the energization of relay R5 is continued through the firing of thyratron 269 or 270 by virtue of relatively close spacing of adjoining perforated signal ordinates. For example, so long as any impulse is received by phototube 52 through aperture 238 or by phototube 54 through wider aperture 239, main motor 5 cannot be started because of the continuing energization of relay R5 by the firing either of thyratron 270 or the firing of thyratron 269 or the firing of both such thyratrons. Current flows in the case of the firing of thyratron 270 through the connectors 153—148, while in the case of the firing of thyratron 269 current flows to the coil of relay R5 through connector 154, movable contact 268, connector 156, movable contact 272 in switch 267 and connector 148. Hence, under such circumstances, the movement of carriage 4 between relatively closely spaced stations corresponding to closely spaced perforations on tape 23, proceeds at the precisely controllable speed of indexing motor 12, without concern for excessive acceleration and overrunning that might be introduced if main motor 5 had been brought into operation.

To illustrate more fully, let it be assumed that the new device has moved carriage 4 and has completed the single tooling operation indicated at ordinate 232 corresponding to particular contact 63b of the contacts 229 in sector 275 of the stepping relay mechanism 61 and has also completed the single tooling operation corresponding to ordinate 233. Further, let it be assumed the perforations 235d and 235e, for example, are longitudinally spaced on tape 23 so as to overlie the partition 41 between apertures 238 and 239 when perforation 234c reaches overlying indexing position relative to aperture 240 and very closely spaced perforation 236e also overlies partition 41 between apertures 238 and 239. Then, the passage of each ordinate 234, 235 and 236 past aperture 238 would cause thyratron 270 to fire to maintain energization of relay R5 at least until ordinate 234 reached aperture 240 to energize relay R1, de-energizing relay R2 and de-energizing relays R3 and R4. Similarly, until relay R2 is de-energized, the passage of the ordinates 234, 235 and 236 past aperture 239 while signal ordinate 234 is on its way to its indexing station overlying aperture 240, would cause thyratron 269 to fire to maintain main motor 5 inactive. The indexed stopping of the vernier motor 12 would occur in connection with operations concerning ordinate line 234 when perforation 234c moves into exact overlying position relative to aperture 240 as described above.

Further, if it be assumed that ordinate 235 overran aperture 238 as ordinate 234 was being moved into indexing position overlying aperture 240, the restarting of the new system to move carriage 4 to the new operation station corresponding to ordinate 235 on tape 23 would not restart main motor 5 even if it be assumed that the time required for any ordinate to move between aperture 238 and aperture 240 was less than the time delay incorporated in relay R3 for the reason that wider aperture 239 acts as a guard aperture. By placing the adjoining edges of apertures 239 and 240 closely together, the new system insures that relay R4 will act before ordinate 235 reaches the farther edge of aperture 239 adjoining aperture 240. As a consequence, the perforations in ordinate 235 will fire thyratron 269 and insure the maintenance of the energization of the coil of relay R5 to in turn maintain main motor 5 de-energized and locked while ordinate 235 with its two perforations, in the illustrated embodiment, moves into indexing position overlying aperture 240 to de-energize relay R2, return switch 263 to the position shown in Figure 13B and stop motor 12. As ordinate 235 registers with aperture 240 and stops in that indexing position, the man operating the new device will push scanning button 79d to begin the operation of stepping relay mechanism 61 whereupon the two selected tooling operations corresponding to perforations 235d and 235e will be performed.

Instead of requiring the pushing of button 79d by a man operating the new device in its illustrated embodiment in order to begin a scanning operation, alternative provision may readily be made when both motors are stopped for the automatic commencement of a scanning operation by shield 62 by the momentary closing of a circuit through line connectors 295 and 296, as will be understood by those skilled in the art to whom this invention is disclosed. Further, although in the illustrated embodiment one or more tooling operations may be caused to occur at respective locations on the work as a consequence of each perforation on each ordinate on tape 23, it is also possible to arrange to have particular perforations on an ordinate operative on the workpiece at the same location.

Upon completion of those tooling operations at station 235, forward button 79a is pushed and in that connection, let it be assumed that ordinate 236 is so close to ordinate 235 that perforation 236e overlay the space between the two apertures 239 and 240 despite their closeness at the time that ordinate 235 overlay aperture 240. Nevertheless, the extremely short travel required to move ordinate 236 into overlying position relative to aperture 240 for indexing will take place only at the vernier speed provided by secondary motor 12. Main motor 5 is not permitted to become actuated under the circumstances stated for the reason that the time delay of relay R3 is always at least as great as the time required for any ordinate, at the speed provided by secondary motor 12 only, to pass from a position overlying aperture 239 or overlying the space between apertures 239 and 240 to indexing position overlying aperture 240. Hence, when perforation 236e indexes with aperture 240, relay R2 will again be instantly de-energized through the action of relay R1 and motor 12 will instantly stop and lock the work on carriage 4 in indexing position for the tooling operation performed at that position in the illustrated embodiment by drill press 214 when the operator presses button 79d.

When all of the tooling operations have been completed following the fabrication controlled by the perforations on ordinate line 237, the operator may push stop button 79b to break the circuit through relay 255 in the remote controller or may press the forward button 79a to send the carriage 4 to the right until it strikes the right-hand lever switch 17 to achieve the same result, thereupon stopping carriage 4. Thereupon, reverse button 79c may be pushed to send carriage 4 to the left toward the starting end of the new device in the illustrated embodiment preparatory to the institution of a new fabrication cycle. During the return stroke from right to left of carriage 4, the connectors 100 and 104 are in the same circuit so that the transformers 301 and 302 are rendered inoperative with the consequence that lamps 43 and 44 are not energized during a full or partial reverse stroke on the part of carriage 4, nor is there power for the relays 293, 297, 298 and 300 in the circuit of stepping relay mechanism 61. Consequently, any full or partial return stroke of sufficient duration will enjoy a fast return at the combined speeds of the motors 5 and 12 operative in the reverse direction to their direction of rotation during the course of a forward working stroke.

It will thus be seen that by means of our new system, absolute and accurate control can be obtained at all times without concern for overrunning or for lack of precision or the closeness of indexing and tooling operation stations. Further, various modifications may be made in the new apparatus and circuits of our invention, which may also be made fully automatic, without departure from the spirit of our invention or the scope of the appended claims.

We claim:

1. In a fabrication system, in combination, a frame, a carriage movable on said frame, a perforated tape connected to said carriage for movement therewith, a control head through which said tape passes in the course of its movement, a plurality of apertures in said head spaced from each other in the direction of movement of said tape, a light source in said head on one side of said tape and apertures, a respective photo-tube for each aperture on the other side of said tape and apertures, means for driving said carriage, at respectively different rates of speed, the lowest rate of speed being sufficiently slow to permit of substantially instant stopping of said carriage at index position, means for slowing said carriage down to said lowest rate of speed when a perforation reaches any aperture except the last while said carriage is being driven at a higher rate of speed, means for preventing said carriage from being driven at a higher rate of speed when a perforation passes over any aperture other than the last of said apertures while said carriage is being driven at said lowest rate of speed, and means for substantially instantly stopping said carriage as each group of at least one perforation registers with the last of said apertures.

2. In a fabrication system, in combination, a carriage movable back and forth in a straight line, a tape connected to said carriage in immovable relation thereto, said tape having perforations therethrough in a predetermined pattern along the length and across the width of said tape, a control head through which said tape passes in the course of movement of said carriage, a light-ray source in said control head on one side of said tape, a receiver sensitive to light rays on the other side of said tape in registry with said source, at least a pair of motors connected in differential speed driving relation to said carriage at the combined speed of said motors, means responsive to a signal from said receiver to de-energize and brake the motor providing the higher of the combined speeds when said last-mentioned motor is rotating and a perforation passes between said source and said receiver, said means being further responsive to a signal from said receiver to maintain the motor providing the higher of the combined speeds in de-energized and braked condition when said last-mentioned motor is not rotating and a perforation passes between said source and said receiver, and means actuated by said last-mentioned perforation to de-energize and brake the motor providing the lower of the combined speeds at an indexing station closely following either response of said first-mentioned means.

3. In a fabrication system, a frame having a longitudinally extending carriage way, a carriage movable in one direction on said way for a work stroke and in the opposite direction on said way for a return stroke, a plurality of reversible motor means respectively connected to said frame and said carriage, one of said motor means adapted to drive at higher speed than the speed at which the other of said motor means is adapted to drive, circuit responsive means capable of obtaining the additive effect of their combined speeds to drive said carriage when both of said motors are energized, a control tape having markings thereon, said control tape being movable relatively in proportion to the movement of said carriage, a control head responsive to said markings on said tape, said control head having at least two control positions, and photoelectric means at said respective control positions for de-energizing said motor means producing a higher speed at the first of said positions if said last-mentioned motor means is operative as a control marking reaches the first of said positions and for de-energizing said motor means having a lower speed at the last of said control positions to stop said carriage when a control marking reaches said last control position.

4. In a fabrication system, in combination, a frame, a relatively movable carriage on said frame, a control tape movable in a predetermined manner relative to said carriage, said tape having control markings, a control head responsive to said control markings on said tape and movable relative thereto, at least two control positions in said control head, the last of said control positions being an index station, at least two motors for driving said carriage, the last of said motors being an indexing motor to drive said carriage at a vernier speed, means at the first of said control positions to transfer and to maintain said carriage under the control of said last motor when respective control markings reach the first of said control positions, and means at the last of said control positions for de-energizing the last of said motors when said respective control markings reach said second control position to index said carriage at said indexing station.

5. In a machine for performing fabrication operations, in combination, an opaque control tape having transverse ordinate positions thereon at longitudinally spaced distances one from another, said tape having one or more perforations in one or more of said ordinate positions, said ordinates being spaced in accordance with the spacing of said fabrication operations, a plurality of impulse sources on one side of said tape to transmit successively through any perforations at each of said ordinate positions, a plurality of respective impulse receivers on the other side of said tape, a partition interposed between said sources and receivers, said partition having apertures in respective alignment with said sources and receivers, a plurality of combinable differential drive means for said machine and for moving said tape relative to said sources and receivers, circuit means for rendering ineffective that portion of said last-mentioned drive means otherwise capable of providing a higher speed component to said relative movement of said tape, means for keeping said circuit means operative as said ordinates pass said apertures except the last thereof, and further circuit means actuated as each ordinate reaches the last of said apertures to stop the balance of said drive means to accurately index said tape with said sources and receivers.

6. In a machine for performing fabrication operations, in combination, a control tape having longitudinally spaced ordinate positions corresponding to the distance between said fabrication operations, said tape further having one or more perforations in one or more of said ordinate positions, a partition having an approach aperture, a guard aperture and an index aperture in that order along a working stroke path of relative travel of said tape, a light source means on one side of said tape adjacent said apertures, phototube means on the other side of said tape adjacent said apertures, at least a pair of interconnected motors, mechanism for combining the speeds of said motors and driving said tape relative to said light source means and phototube means between ordinate positions spaced farther apart, mechanism for at least maintaining said one of said motors stopped between ordinate positions spaced closer together by energization of said phototube means through either said approach or said guard aperture and the relative passage of perforations across one of said last-named apertures, mechanism responsive to each ordinate reaching said index aperture to de-energize the other of said motors, and means to transmit light impulses through perforations in the ordinate in registry with the index aperture and that index aperture to effect said fabrication operations.

7. In a fabrication system, in combination, a carriage, a control tape having longitudinally spaced ordinate positions, said tape further having one or more perforations in one or more of said ordinate positions, a partition having an approach aperture, a guard aperture and an index aperture in that order along a working stroke path of travel of said tape, at least one light source on one side of said partition adjacent said apertures, a phototube adjacent each aperture on the other side of partition, at least a pair of differentially connected motors, one of said motors being adapted to drive said carriage and tape at a higher speed and the other adapted to drive said tape at a lower speed, mechanism for combining the speeds of said motors to drive said carriage and tape between ordinate positions spaced farther apart, mechanism for at least maintaining said one of said motors stopped between ordinate positions spaced closer together when one of said phototubes for said approach and guard apertures is responsive to the passage of perforations across one of said last-named apertures, mechanism responsive to each ordinate reaching said index aperture to de-energize said other of said motors, means for energizing a selector shield for movement to transmit light impulses successively through perforations in the ordinate in registry with the index aperture, and tool operation mechanism actuated in correspondence with impulses transmitted through said shield to effect selective tooling operations.

8. In a fabrication system, in combination, a frame, a carriage movable back and forth on said frame to move through working and return strokes, a control tape mounted on said carriage and having longitudinally spaced ordinate positions, said tape further having one or more perforations in each of said ordinate positions, a partition having an approach aperture, a guard aperture and an index aperture in that order along a working stroke path of travel of said tape, at least one light source on one side of said tape and partition adjacent said aperture, a phototube adjacent each aperture on the other side of said tape and partition, a pair of differentially connected motors, one of said motors being connected to said carriage and the other of said motors being mounted on said frame, a nut turned by one of said motors, a threaded drive shaft turned by the other of said motors, said nut and drive shaft also being in engagement, said motors further being adapted to produce a higher and a lower speed respectively in the course of the movement of said carriage and tape, mechanism for combining the speeds of said motors in driving said carriage and tape between ordinate positions spaced farther apart in the course of a working stroke, mechanism for selecting that motor providing the lower speed in driving between ordinate positions spaced closer together when one of said phototubes for said approach and guard apertures is responsive to the passage of perforations across one of said last-named apertures in the course of a working stroke, mechanism responsive to each ordinate reaching said index aperture to de-energize that last-mentioned motor in the course of a working stroke, a scanning circuit connected to a stepping mechanism, means for energizing said stepping mechanism, a selector shield for movement with said stepping mechanism to transmit light impulses successively through perforations in the ordinate in registry with the index aperture in temporal and positional correspondence with a workpiece on said carriage to effect selective tooling operations on said workpiece, and means for initiating movement of said carriage to the next ordinate position by said motor adapted to produce the lower speed.

9. In a fabrication system, in combination, a carriage movable back and forth in a straight line, a tape connected to said carriage in immovable relation thereto, said tape having perforations therethrough in a predetermined pattern on abscissas along the length and on ordinates across the width of said tape, a blower directed against said tape, a control head through which said tape passes in the course of movement of said carriage, a light source in said control head on one side of said tape, a phototube receiver on the other side of said tape in registry with said source, at least a pair of motors connected in differential speed driving relation to said carriage at the combined speed of said motors, means responsive to a signal from said receiver to render ineffective the motor capable of providing the higher of the combined speeds when an ordinate containing at least one perforation passes between said source and said receiver, means actuated by said last-mentioned perforation to de-energize and brake the motor providing the lower of the combined speeds at an indexing station closely following upon the operation of said first-mentioned means, and a cylindrical scanning shield having helically arranged pinholes therein to selectively transmit impulses through each perforation on an ordinate in registry with said indexing station at one time to selectively actuate further circuits.

10. In a fabrication system, a frame having a longitudinally extending carriage way, a carriage movable in one direction on said way for a work stroke and in the opposite direction on said way for a return stroke, a threaded driving shaft extending parallel to said way, a driven nut on said shaft connected to said carriage to drive it, reversible motor means for rotating said nut, a second reversible motor means for rotating said drive shaft, one of said motor means adapted to drive at higher speed than the speed at which the other of said motor means is adapted to drive, circuit means for obtaining the additive effect of their combined speeds to drive said carriage when both of said motors are energized, a replaceable control tape having markings thereon, said control tape being movable in fixed relation to the movement of said carriage, a control head responsive to said markings on said tape, said control head having at least two control positions, and photoelectric means at said respective control positions, said photoelectric means at the first of said control positions being adapted to de-energize said motor means producing a higher speed if said last-mentioned motor means is operative as a control marking reaches the first of said positions and to maintain the de-energization of said motor means producing a higher speed if said last-mentioned motor means is not operative as a control marking reaches the first of said positions, said photoelectric means at said last control position being adapted to de-energize said motor means having a lower speed to stop said carriage when a control marking reaches said last control position.

11. In a fabrication machine to perform tooling operations, in combination, a frame, a carriage movable on said frame, tooling means mounted on said frame in juxtaposition to work carried by said carriage, a tape connected to said carriage for movement therewith and having a number of perforations equal in number and proportional in spacing to said tooling operations to be performed, a control head through which said tape passes in the course of its movement, a plurality of apertures in said head spaced from each other in the direction of movement of said tape, a light source in said head on one side of said tape and apertures, a respective phototube for each aperture on the other side of said tape and apertures, means for driving said carriage at respectively different rates of speed, the lowest rate of speed being sufficiently slow to permit instant stopping of said carriage at index position, means for slowing said carriage down to said lowest rate of speed when a perforation passes over any apertures except the last while said carriage is being driven at a higher rate of speed, means for preventing said carriage from being driven at a higher rate of speed when a perforation passes over any aperture other than the last of said apertures while said carriage is being driven at said lowest rate of speed, means for instantly stopping said carriage when a perforation registers with the last of said apertures, means for transmitting light impulses through said last of said apertures and each perforation on said tape at said last of said apertures in succession to operate said tooling means selectively in correspondence with perforations in said tape, and means for reversing the direction of movement of said means of driving said carriage to move said carriage in the opposite direction on said frame at a higher rate of speed than said lowest rate of speed, said last-mentioned means including means for rendering said tooling means ineffective during said movement of said carriage in said opposite direction.

12. In a fabrication system, in combination, a movable carriage, an opaque control tape fixed to said carriage, said tape having perforations in a predetermined pattern along the length and across the width thereof, a control head for said tape, said control head having a plurality of apertures in spaced relation along one side of said tape, a phototube for each of said apertures on the other side of said tape, means for passing a light through each of said apertures when overlain by one or more of said perforations in said tape, means for amplifying signals from the response of said phototubes to said light respectively, a pair of driving motors for said carriage, said motors having fast-acting brakes to brake and lock the respective motors as each is de-energized, the first of said motors adapted to produce a higher speed and the second of said motors adapted to produce a lower speed, a differential connection to combine the speeds of said motors in said drive for said carriage when both of said motors are energized, means operative through said last-mentioned means to first control the motor capable of producing the higher speed and then to stop the motor producing the lower speed as said perforations successively pass over said apertures in a working stroke direction, and means for returning said carriage without stopping in a return stroke direction.

13. In a fabrication system for fabrication work successively moved along and stopped at an indexing position for tooling, in combination, a remote controller having a working stroke relay and a return stroke relay, means for energizing and sealing-in one of said relays at a time, a motor controller for a main motor and a secondary motor, a main motor relay normally holding open a power circuit from said remote controller to said main motor, said motor controller having a gang switch operating relay to connect said remote controller to said secondary motor and to said main motor when the coil of said main motor relay is de-energized, a pair of time delay relays energized when said gang switch is closed, one of said time delay relays having a shorter time factor than the other upon the energization of the respective coils thereof, a pair of photoelectrically responsive interdiction circuits connected to said time delay relays respectively to be connected to said main motor relay in accordance with the sequential energization of said time delay relays, an impulse source capable of energizing said interdiction circuits to re-energize said main motor relay after said time delay relays have acted, a normally de-energized control relay adapted to break the circuit through the coil of said gang switch operating relay to open said gang switch and to disconnect said secondary motor and de-energize said time delay relays, a photoelectrically responsive indexing circuit at said indexing position capable of energizing said control relay, an impulse source capable of energizing said indexing circuit to energize said control relay following the energization of any of the interdiction circuits, said respective interdiction circuits being positioned relative to said indexing position such that the interdiction circuit connected to said time delay relay having a shorter time factor is nearer to said indexing position, a control tape at said indexing position between said indexing circuit and its respective impulse source, said control tape having at least one perforation therein at said indexing position, a scanning shield and circuit to scan said tape at said indexing position and successively transmit impulses to said indexing circuit through perforations in said tape at said indexing position, a timing circuit connected to said scanning circuit to operate tools in accordance with the impulses transmitted to said indexing circuit to fabricate said work at said indexing position by successive tool operations in accordance with perforations on said tape at said indexing position.

14. In a fabrication system, in combination, a tape having markings for photoelectric control, a remote controller having a working stroke relay and a return stroke relay, means for energizing and sealing-in one of said relays at a time, a motor controller for a main motor and a secondary motor, a main motor relay capable of opening and of holding open a power circuit from said remote controller to said main motor respectively to initiate and maintain de-energization of said main motor, said motor controller having a gang switch operating relay to connect said remote controller to said secondary motor and to said main motor when the coil of said main motor relay is de-energized, a pair of differentially timed time delay relays energized when said gang switch is closed, a pair of photoelectric main motor interdiction circuits connected to said main motor relay in accordance with the sequential energization of said time delay relays, at least one impulse source cooperating with said marking to energize said interdiction circuits to re-energize said main motor relay after said time delay relays have acted, a normally de-energized control relay to break the circuit through the coil of said gang switch operating relay to open said gang switch and stop said secondary motor and to de-energize said time delay relays, a photoelectric indexing circuit, an impulse source cooperating with said markings to energize said indexing circuit to energize said control relay following the energization of any of said interdiction circuits, a scanning and stepping circuit to initiate, select and time impulses to said indexing circuit following the opening of said gang switch, and a tool circuit responsive to sequential energization transmitted in said scanning circuit to fabricate work.

15. In a fabrication system for work on a traveling carriage, in combination, a power controller having a working stroke relay and a return stroke relay, means for energizing one of said relays at a time to provide power at the output end of said power controller, a motor controller for a main motor and a secondary motor, a main motor relay normally holding open a main motor switch between said power controller and said main motor, said motor controller having a gang switch operating relay to connect said power controller to said secondary motor and to said main motor when the coil of said main motor relay is de-energized, at least one time delay relay energized when said gang switch is closed, a photoelectrically responsive main motor interdiction circuit connected to said main motor relay when said time delay relay acts, an impulse source to energize said interdiction circuit to energize said main motor relay after said time delay relay has acted, a normally de-energized control relay to break the circuit through the coil of said gang switch operating relay to open said gang switch and stop said secondary motor, a photoelectrically responsive indexing circuit for said control relay, an impulse source to energize said indexing circuit to energize said control relay following the energization of said interdiction circuit, a scanning circuit to select impulses to said indexing circuit following the stopping of said secondary motor, and a tool circuit responsive to impulses transmitted in said scanning circuit to fabricate work on said carriage.

16. In a fabrication machine for performing one or more tooling operations upon a workpiece, apparatus comprising, in combination, responsive relatively movable workpiece and tool carrying elements, at least one control tape member having one or more perforations located in one or more positions generally corresponding to the pattern of said tooling operations, said perforations being spaced along the length of the tape member at least in proportion to the spacing of said tooling operations to be performed upon said workpiece, a control head member for said tape member, said control head member having a plurality of sensitive cells on one side of said tape member and an impulse source for said cells respectively on the other side of said tape member, one of said members being connected to one of said elements, the other of said members being connected to the other of said elements, a main motor operatively connectible to one of said elements to move it at a faster rate of speed, an indexing motor operatively connectible to said last-named one of said elements to move it at a slower rate of speed, means to operatively disconnect said main motor upon the transmission of an impulse from said source through a perforation in said tape member to the one of said cells nearer thereto in the course of its relative approach, and means for stopping said indexing motor upon the transmission of an impulse through said last-mentioned perforation to a somewhat farther cell in spaced alignment to said one of said cells nearer thereto.

17. In a fabrication machine for performing one or more tooling operations upon a workpiece, apparatus comprising, in combination, a movable carriage, a control tape member having one or more minute perforations located in one or more abscissa positions along the length of said tape member and one or more ordinate positions across the width of said tape member, said perforations being spaced longitudinally relative to said tape member at distances equal to the actual spacing of said tooling operations to be performed upon said workpiece, said tape member being mounted in a manner parallel to the direction of movement of said carriage, a control head member for said tape member, said control head member having a plurality of longitudinally spaced sensitive cells on one side of said tape member and an impulse source for said cells respectively on the other side of said tape member, one of said members being rigidly connected to said carriage, the other of said members being connected to said machine so as to be immovable relative to said carriage and the member connected thereto, a main motor operatively connected to said carriage to move it at a faster rate of speed, an indexing motor operatively connected to said carriage to move it at a slower rate of speed, means to operatively disconnect said main motor from said carriage upon the transmission of an impulse from said source through a perforation in said tape to the one of said cells nearer to said carriage in the course of its approach, means for index stopping said indexing motor upon the transmission of an impulse through said last-mentioned perforation to another of said longitudinally spaced cells behind said last-mentioned cell, and tooling means operatively connected to said machine and responsive to each perforation on a particular ordinate line having a perforation through which said last-mentioned impulse was transmitted.

18. In a fabrication machine for performing one or more tooling operations upon a workpiece, apparatus comprising, in combination, a movable carriage, an opaque control tape member having one or more perforations in a selected pattern, said perforations being located in one or more abscissa positions along the length of said tape member and one or more ordinate positions across the width of said tape member, said perforations being spaced longitudinally relative to said tape member in proportion to the spacing of said tooling operations to be performed upon said workpiece, said tape member being rigidly connected to said carriage parallel to the direction of movement of said carriage, a control head member for said tape member rigidly connected to said machine, said control head member having a plurality of longitudinally spaced advance, slowdown and index photoelectric cells on one side of said tape member and a light source for said cells respectively on the other side of said tape member, a main motor operatively connected to said carriage to move it at a faster rate of speed, an indexing motor operatively connected to said carriage to move it at a slower rate of speed, means to operatively disconnect said main motor from said carriage upon the transmission of light through any perforation to said advance and slowdown cells, means for index stopping and braking said indexing motor upon the transmission of light through any perforations to said index cell, tooling means operatively connected to said machine and responsive to each perforation on a particular ordinate line having a perforation through which light is transmitted to said index cell, and means to determine the time of operative connection of said tooling means when said carriage is stopped at said indexing position.

19. A fabrication machine for performing tooling operations upon a workpiece at a plurality of selected locations spaced in a linear direction and forming a pattern, comprising, in combination, a workpiece holder, a tool holder, means for moving said holders relative to one another in said linear direction and stopping at one of said successively spaced selected locations in that direction, a control tape having a pattern of work location markings in accord with the pattern of said selected locations for respective tooling operations with the spacing of said markings along the length of said tape corresponding to the spacing of said selected locations in said linear direction, a control head to read said markings on said tape, means for mounting said tape on one of said holders in fixed relation thereto to extend in said linear direction, and means for mounting said head on the other of said holders in fixed relation thereto and in corresponding relation to said tape in said linear direction as that existing between said holders, said first-named means for moving said holders being responsive to the respective coaction between said tape and head at each one of said markings to sequentially position said holders in correspondence with successive spaced ones of said markings on said tape in said linear direction for successive positioning of said workpiece for tooling thereof at said selected locations.

References Cited in the file of this patent

UNITED STATES PATENTS

| | | |
|---|---|---|
| 395,592 | Schwarzler | Jan. 1, 1889 |
| 2,151,570 | Shoults et al. | Mar. 21, 1939 |

(Other references on following page)

UNITED STATES PATENTS

| | | |
|---|---|---|
| 2,326,848 | Fanning | Aug. 17, 1943 |
| 2,381,039 | Churchill | Aug. 7, 1945 |
| 2,412,619 | Kindermann et al. | Dec. 17, 1946 |
| 2,433,145 | Nord | Dec. 23, 1947 |
| 2,479,293 | Bayless | Aug. 16, 1949 |
| 2,519,042 | Granberg et al. | Aug. 15, 1950 |
| 2,537,770 | Livingston et al. | Jan. 9, 1951 |
| 2,546,957 | Ray | Mar. 27, 1951 |
| 2,575,034 | Tyler et al. | Nov. 13, 1951 |
| 2,628,539 | Neergaard | Feb. 17, 1953 |
| 2,628,680 | Seybold | Feb. 17, 1953 |
| 2,681,717 | Spurgeon | June 22, 1954 |
| 2,690,532 | Johnson | Sept. 28, 1954 |
| 2,694,804 | Wagner | Nov. 16, 1954 |
| 2,710,934 | Senn | June 14, 1955 |
| 2,748,665 | Senn | June 5, 1956 |
| 2,785,353 | Fenemore | Mar. 12, 1957 |

UNITED STATES PATENT OFFICE

CERTIFICATE OF CORRECTION

Patent No. 2,947,203                          August 2, 1960

Carlo Ausenda et al.

It is hereby certified that error appears in the printed specification of the above numbered patent requiring correction and that the said Letters Patent should read as corrected below.

Column 11, line 69, for "which" read -- when --; line 70, for "Ths" read -- The --; column 13, line 32, for "153" read -- 253 --; column 23, line 23, for "responsive" read -- respective --.

Signed and sealed this 31st day of January 1961.

(SEAL)
Attest:

KARL H. AXLINE
Attesting Officer

ROBERT C. WATSON
Commissioner of Patents